(12) United States Patent
Kunieda et al.

(10) Patent No.: US 7,851,403 B2
(45) Date of Patent: Dec. 14, 2010

(54) HONEYCOMB STRUCTURE

(75) Inventors: Masafumi Kunieda, Gifu (JP); Mari Kitajima, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 274 days.

(21) Appl. No.: 12/246,869

(22) Filed: Oct. 7, 2008

(65) Prior Publication Data

US 2009/0247394 A1    Oct. 1, 2009

(30) Foreign Application Priority Data

Mar. 27, 2008 (JP) ............... PCT/JP2008/055978

(51) Int. Cl.
*B01J 23/40* (2006.01)
*B01J 23/58* (2006.01)

(52) U.S. Cl. ............ 502/325; 502/326; 502/328; 502/330; 502/332; 502/333; 502/334; 502/339; 502/340; 502/341; 502/344; 502/527.12; 502/527.19; 502/527.24

(58) Field of Classification Search ............ 502/325, 502/326, 328, 330, 332, 333, 334, 339, 340, 502/341, 344, 527.12, 527.19, 527.24
See application file for complete search history.

(56) References Cited

U.S. PATENT DOCUMENTS

| 2002/0077248 A1 | 6/2002 | Nakanishi et al. |
| 2005/0076626 A1 | 4/2005 | Kudo et al. |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0248238 A1 | 10/2008 | Tomita et al. |
| 2008/0260991 A1 | 10/2008 | Konstandopoulos et al. |

FOREIGN PATENT DOCUMENTS

| EP | 0460388 | 12/1991 |
| EP | 1717218 | 11/2006 |
| JP | 03-065306 | 3/1991 |
| JP | 06-058138 | 3/1994 |
| JP | 2002-159859 | 6/2002 |
| JP | 2003-112048 | 4/2003 |
| JP | 2007-229698 | 9/2007 |
| WO | WO 03/067042 | 8/2003 |
| WO | WO 2005/063653 | 7/2005 |
| WO | WO 2007/069674 | 6/2007 |

*Primary Examiner*—Elizabeth D Wood
(74) *Attorney, Agent, or Firm*—Dittahavong Mori & Steiner, P.C.

(57) ABSTRACT

A honeycomb structure includes adhesive layers and plural honeycomb units bonded to each other by interposing the adhesive layers between the plural honeycomb units. Each of the honeycomb units has partition walls extending along a longitudinal direction of the honeycomb units to define plural through holes. The plural honeycomb units include a SOx absorbent, inorganic particles, and an inorganic binder. An expression $Y \leq -0.3X+1.55$ (about $1.0 \leq X \leq$ about $2.5$) is satisfied, in which X represents a content (mol/L) of the SOx absorbent in the partition walls and Y represents a ratio B/A in which A represents a Young's modulus of the honeycomb units and B represents a Young's modulus of the adhesive layers.

19 Claims, 2 Drawing Sheets

HONEYCOMB STRUCTURE

CROSS-REFERENCE TO RELATED APPLICATIONS

The present application claims priority under 35 U.S.C. §119 to PCT/JP2008/055978 filed on Mar. 27, 2008. The contents of this application are incorporated herein by reference in their entirety.

BACKGROUND OF THE INVENTION

1. Field of the Invention

The present invention relates to a honeycomb structure.

2. Discussion of the Background

In related-art honeycomb catalysts used for conversion of exhaust gas of automobiles, a layer of a high specific surface area material such as activated alumina is formed on the surface of a honeycomb structure made of cordierite, and a catalyst such as platinum is supported on the layer of the high specific surface area material. In the case of honeycomb catalysts used for conversion of exhaust gas from diesel engines, a NOx absorbent is further supported for treating NOx in an excess oxygen atmosphere.

The NOx absorbent, however, has a characteristic that absorbs SOx more stably than NOx, and hence the NOx absorbent becomes unable to absorb NOx due to absorption of SOx, resulting in SOx poisoning.

To solve this problem, Japanese Patent Laid-Open Publication No. 6-58138 discloses a sulfur trap comprising a sulfur absorbent and a casing surrounding the sulfur absorbent, which are disposed in an exhaust gas passage upstream of a NOx absorbent. In an illustrated example, the sulfur absorbent includes at least one selected from alkali metals such as potassium, sodium, lithium and cesium, alkali earth metals such as barium and calcium, and rare earth metals such as lanthanum and yttrium; and a noble metal such as platinum, which are supported on an alumina carrier. Also, a honeycomb structure such as one described in PCT International Publication No. WO05/063653 (corresponding to U.S. Patent Application Publication No. US 2005/0266992 A1) is disclosed.

The contents of Japanese Patent Laid-Open Publication No. 6-58138 and PCT International Publication No. WO05/063653 are incorporated by reference in their entirety.

SUMMARY OF THE INVENTION

According to an aspect of the present invention, a honeycomb structure includes adhesive layers and plural honeycomb units bonded to each other by interposing the adhesive layers between the plural honeycomb units. Each of the honeycomb units has partition walls extending along a longitudinal direction of the honeycomb units to define plural through holes. The plural honeycomb units include a SOx absorbent, inorganic particles, and an inorganic binder. An expression $Y \leq -0.3X+1.55$ (about $1.0 \leq X \leq$ about 2.5) is satisfied, in which X represents a content (mol/L) of the SOx absorbent in the partition walls and Y represents a ratio B/A in which A represents a Young's modulus of the honeycomb units and B represents a Young's modulus of the adhesive layers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Preferred embodiments of the present invention are described below with reference to the accompanying drawings.

Figure 1A:
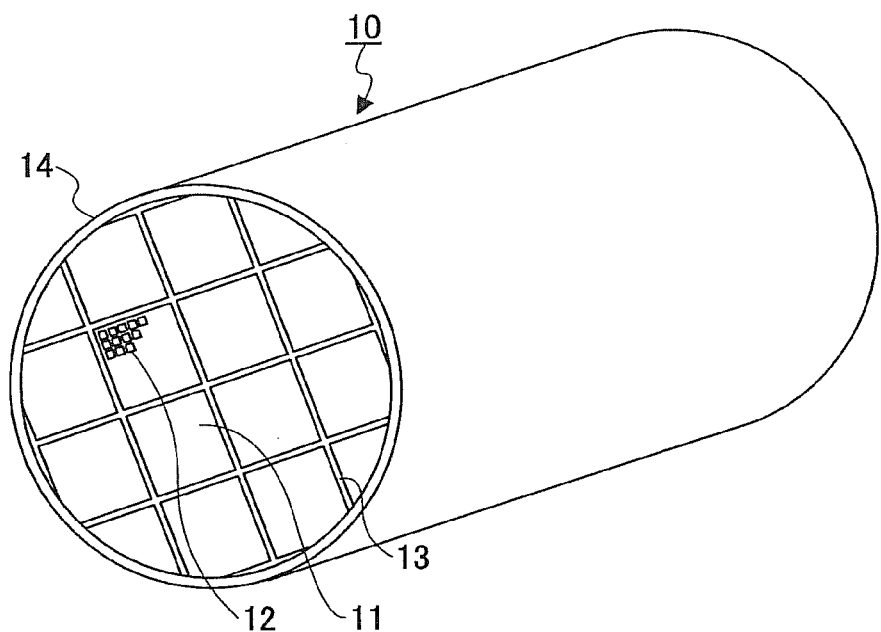
FIG. 1A is a perspective view illustrating an example of a honeycomb structure according to an embodiment of the present invention.
Figure 1B:
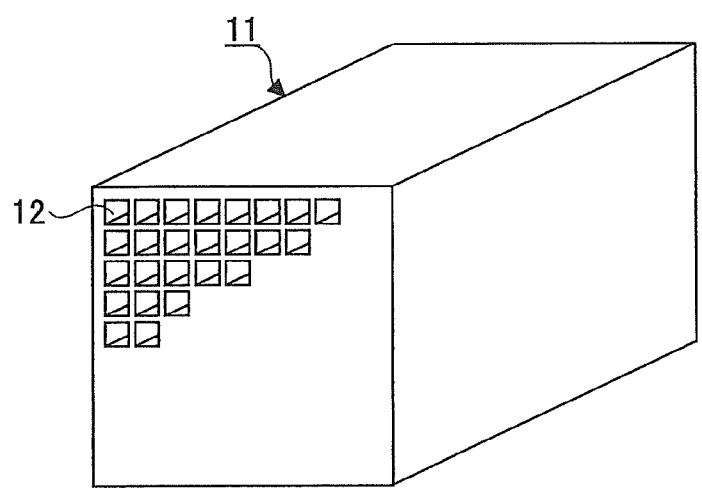
FIG. 1B is a perspective view illustrating a honeycomb unit of the honeycomb structure of FIG. 1A.

FIGS. 1A and 1B illustrate an example of a honeycomb structure 10 according to an embodiment of the present invention. The honeycomb structure 10 includes plural honeycomb units 11 bonded to each other by interposing adhesive layers 13, each of which honeycomb units 11 has plural through holes 12 that are longitudinally aligned and separated from each other by partition walls. The peripheral face of the honeycomb structure 10 is coated with a peripheral coating layer 14. Each of the honeycomb units 11 includes a SOx absorbent, inorganic particles, and inorganic fibers. Further, the expression (inequality) $Y \leq -0.3X+1.55$ (about $1.0 \leq X \leq$ about 2.5) is satisfied, in which X represents the content (mol/L) of the SOx absorbent in the partition walls and Y represents the ratio of the Young's modulus B of the adhesive layers 13 to the Young's modulus A of the honeycomb units 11, i.e., the ratio B/A. In the honeycomb structure 10 with this configuration, even after absorbing SOx, the adhesive layers 13 can easily relax stress. More specifically, the Young's modulus of the adhesive layers 13 is determined based on the Young's modulus of the honeycomb units 11 that decreases due to absorption of SOx by the honeycomb structure 10, thereby easily preventing the honeycomb structure 10 from being damaged destruction. The honeycomb structure 10 is disposed upstream, with respect to the flow of exhaust gas, of a honeycomb structure including a NOx absorbent, thereby easily preventing SOx poisoning in the NOx absorbent.

In the case of using a sulfur trap as disclosed in Japanese Patent Laid-Open Publication No. 6-58138, however, the size needs to be increased to allow the sulfur trap to absorb a large amount of sulfur. To obviate this need, a honeycomb structure such as one disclosed in PCT International Publication No. WO05/063653 may be used. The honeycomb structure includes porous honeycomb units each having multiple through holes and containing an inorganic material in a first form (e.g., ceramic particles), an inorganic material in a second form (e.g., inorganic fibers, and ceramic particles having large particle diameter), and an inorganic binder. The honeycomb units are joined to each other at their outer surfaces along the through holes by interposing sealing layers. This honeycomb structure has a great specific surface area, thereby allowing easy reduction in size.

However, if such a honeycomb structure is used for the purpose of absorbing SOx, the porosity of the honeycomb units easily decreases as the honeycomb units absorb SOx, so that Young's modulus easily varies. Then, adhesive layers cannot easily relax thermal stress, which causes the honeycomb structure to become damaged more easily.

A honeycomb structure of an embodiment of the present invention is not easily damaged even if the honeycomb structure has absorbed a large amount of SOx.

The SOx absorbent may be any kind of SOx absorbent that reacts with SOx and absorbs it as hydrosulfate. Non-exclusive examples of a SOx absorbent may include alkali metals such as sodium and potassium, and alkali earth metals such as magnesium, calcium and barium. These may be used alone or in combination of two or more.

The SOx absorbent may be contained in the partition walls of the honeycomb unit 11 or may be supported on the partition walls. Alternatively, a part of the SOx absorbent may be contained in the partition walls and the other part of the SOx absorbent may be supported on the partition walls. In this case, the SOx absorbent contained in the partition walls and the SOx absorbent supported on the partition walls may be made of the same material or may be made of the different materials.

In the honeycomb structure 10, the content of the SOx absorbent in the partition walls is preferably in the range of about 1.0-about 2.5 mol/L. If the content of the SOx absorbent in the partition walls is about 1.0 mol/L or more, a sufficient level of SOx absorbing performance can easily be maintained, and the size of the honeycomb structure can easily be reduced. Further, if the content of the SOx absorbent in the partition walls is about 2.5 mol/L or less, the honeycomb structure 10 can easily be manufactured.

The inorganic particles may be any kind of inorganic particle that is made of an inorganic compound and increases the specific surface area of the honeycomb structure 10 to allow the SOx absorbent to more easily absorb SOx. Non-exclusive examples of inorganic particles may include alumina, titania, silica, zirconia, ceria, mullite, zeolite and the like. These may be used alone or in combination of two or more. Alumina is more preferable among them.

The average particle diameter of the inorganic particles is in the range of about 0.1-about 10 µm. If the average particle diameter is about 0.1 µm or more, there is no need to add a large amount of inorganic binder, so that extrusion molding can easily be performed. Further, if the average particle diameter is about 10 µm or less, the specific surface area of the honeycomb structure 10 can be easily sufficiently increased.

The content of the inorganic particles in the honeycomb unit 11 is preferably in the range of about 30-about 90 wt %, more preferably in the range of about 40-about 80 wt %, and still more preferably in the range of about 50-about 75 wt %. If the inorganic particle content is about 30 wt % or more, the specific surface area of the honeycomb unit 11 is easily increased. Further, if the inorganic particle content is about 90 wt % or less, the strength of the honeycomb unit 11 is easily increased.

Non-exclusive examples of an inorganic binder include solids contained in alumina sol, silica sol, titanium sol, liquid glass, sepiolite, attapulgite and the like. These may be used alone or in combination of two or more.

The content of the inorganic binder in the honeycomb unit 11 is preferably in the range of about 5-about 50 wt %, more preferably in the range of about 10-about 40 wt %, and still more preferably in the range of about 15-about 35 wt %. If the inorganic binder content is about 5 wt % or more, the strength of the honeycomb unit 11 is easily increased. Further, if the inorganic binder content is about 50 wt % or less, molding can easily be performed.

The honeycomb unit 11 preferably further includes inorganic fibers to easily improve the strength of the honeycomb unit 11.

The inorganic fibers may be any kind of inorganic fiber that improves the strength of the honeycomb unit 11. Non-exclusive examples of inorganic fibers may include alumina, silica, silicon carbide, silica alumina, glass, potassium titanate, aluminum borate and the like. These may be used alone or in combination of two or more.

The aspect ratio of the inorganic fibers is preferably in the range of about 2-about 1,000, more preferably in the range of about 5-about 800, and still more preferably in the range of about 10-about 500. If the aspect ratio is about 2 or more, the strength of the honeycomb unit 11 is easily increased. Further, if the aspect ratio is about 1,000 or less, it is easy to prevent clogging during a molding process using an extrusion molding technique or the like, and to prevent inorganic fibers from being broken during a molding process, thereby easily increasing the strength of the honeycomb unit 11.

The content of the inorganic fibers in the honeycomb unit 11 is preferably in the range of about 3-about 50 wt %, more preferably in the range of about 5-about 40 wt %, and still more preferably in the range of about 8-about 30 wt %. If the inorganic fiber content is about 3 wt % or more, the strength of the honeycomb unit 11 is easily increased. Further, if the inorganic fiber content is about 50 wt % or less, the specific surface area of the honeycomb unit 11 is easily increased.

The area of the cross section of the honeycomb unit 11 perpendicular to the longitudinal direction, i.e., the cross section perpendicular to the through holes 12 is preferably in the range of about 5-about 50 $cm^2$. If the cross-sectional area is 5 $cm^2$ or more, the specific surface area of the honeycomb structure 10 is easily increased, thereby easily reducing the pressure loss. Further, if the cross-sectional area is 50 $cm^2$ or less, a sufficient strength against thermal stress in the honeycomb unit 11 is easily obtained.

The thickness of the partition walls between the through holes 12 of the honeycomb unit 11 is preferably in the range of about 0.05-about 0.35 mm, more preferably in the range of about 0.10-about 0.30 mm, and still more preferably in the range of about 0.15-about 0.25 mm. If the partition wall thickness is about 0.05 mm or more, the strength of the honeycomb unit 11 is easily increased. Further, if the partition wall thickness is about 0.35 mm or less, exhaust gas is easily penetrated into the partition walls, thereby easily increasing the performance of absorbing SOx.

The number of through holes 12 per 1 $cm^2$ cross-sectional area of the honeycomb unit 11 perpendicular to the longitudinal direction is preferably in the range of about 15.5-about 186 holes, more preferably in the range of about 46.5-about 170.5 holes, and still more preferably in the range of about 62.0-about 155 holes. If the honeycomb unit 11 has about 15.5 through holes 12 per 1 $cm^2$ or more, the strength of the honeycomb unit 11 is easily increased. Further, if the honeycomb unit 11 has about 186 through holes 12 per 1 $cm^2$ or less, pressure loss of the honeycomb unit 11 is easily reduced.

The thickness of the adhesive layers 13 bonding the honeycomb units 11 to each other is preferably in the range of about 0.5-about 2 mm. If the adhesive layers 13 have thickness of about 0.5 mm or more, a sufficient adhesion force is easily obtained. Further, if the adhesive layers 13 have thickness of about 2 mm or less, the specific surface area of the honeycomb structure 10 is easily increased, and the pressure loss of the honeycomb structure 10 is easily reduced.

The thickness of the peripheral coating layer 14 is preferably in the range of about 0.1-about 3 mm. If the thickness of the peripheral coating layer 14 is about 0.1 mm or more, a sufficient effect of increasing the strength of the honeycomb structure 10 is easily obtained. Further, if the thickness of the peripheral coating layer 14 is about 3 mm or less, the specific area of the honeycomb structure 10 is easily increased.

Although the honeycomb structure 10 of the illustrated embodiment of the present invention has a cylindrical shape, the honeycomb structure 10 may have any shape such a rectangular pillar shape and a cylindroid shape.

Although the honeycomb unit 11 of the illustrated embodiment of the present invention has a square-pillar shape, the honeycomb unit 11 may have any shape, preferably shapes such as a hexagonal pillar shape that allow the honeycomb units 11 to be easily bonded to each other.

Although the through hole 12 of the illustrated embodiment of the present invention has a rectangular pillar shape, the through hole 12 may have any shape such a triangular pillar shape and a hexagonal pillar shape.

A noble metal catalyst may be supported on the partition walls of the honeycomb unit 11. The noble metal catalyst may be any kind of noble metal catalyst that oxidizes $SO_2$ to $SO_3$. Non-exclusive examples of a noble metal catalyst include platinum, palladium, rhodium and the like. These may be used alone or in combination of two or more.

An example of a manufacturing method of the honeycomb structure 10 is described below. First, molding such as extrusion molding is performed using a raw material paste, which contains inorganic particles and inorganic binders and, if necessary, further contains an SOx absorbent and inorganic fibers, to form a raw honeycomb molded body that has plural longitudinally aligned through holes. In this way, a honeycomb unit 11 having sufficient strength can be obtained even if fired at low temperatures.

Examples of an inorganic binder contained in the raw material paste may include alumina sol, silica sol, titanium sol, liquid glass, sepiolite, attapulgite and the like. These may be used alone or in combination of two or more.

An organic binder, a dispersion solvent, and a molding assisting agent and the like may be added to the raw material paste if necessary.

Non-exclusive examples of an organic binder may include methylcellulose, carboxymethylcellulose, hydroxyethylcellulose, polyethyleneglycol, phenol resin, epoxy resin and the like. These may be used alone or in combination of two or more. The content of the organic binder is preferably in the range of about 1 to about 10% of the total weight of the inorganic particles, the inorganic fibers, and the inorganic binder.

Non-exclusive examples of a dispersion solvent may include organic solvent such as water and benzene, alcohol such as methanol and the like. These may be used alone or in combination of two or more.

Non-exclusive examples of a molding assisting agent may include ethylene glycol, dextrin, fatty acid, fatty acid soap, polyalcohol and the like. These may be used alone or in combination of two or more.

When preparing the raw material paste, the components of the raw material paste are preferably mixed and kneaded. These components may be mixed using a mixer, an attritor or the like, and be kneaded using a kneader or the like.

The resulting molded body is dried using a drying apparatus such as a microwave drying apparatus, a hot air drying apparatus, a dielectric drying apparatus, a low-pressure drying apparatus, a vacuum drying apparatus, and a freezing drying apparatus.

Then the resulting honeycomb molded body is degreased. Although degreasing conditions may be suitably selected according to the kind and amount of organic substances contained in the molded body, degreasing is preferably performed at about 400° C. for about 2 hours.

Then the resulting honeycomb molded body is fired to obtain a honeycomb unit 11. The firing temperature is preferably in the range of about 600-about 1,200° C., and more preferably in the range of about 600-about 1,000° C. If the firing temperature is about 600° C. or more, firing easily progresses, thereby easily increasing the strength of the honeycomb structure 10. Further, If the firing temperature is about 1,200° C. or less, it is possible to prevent excessive progress of firing, thereby easily increasing the specific surface area of the honeycomb structure 10.

Then an adhesive paste is applied onto the peripheral faces of plural of the honeycomb units 11 to bond the honeycomb units 11 to each other. The adhesive paste is dried and solidified to form an assembly of the honeycomb units 11. After forming the assembly of the honeycomb units 11, the assembly is cut into a cylindrical shape and may be polished. Alternatively, honeycomb units 11 molded in sector shapes or square shapes in cross-section may be bonded to each other such that an assembly of the honeycomb units 11 having a cylindrical shape is formed.

Non-exclusive examples of an adhesive paste may include a mixture of an inorganic binder and inorganic particles, a mixture of an inorganic binder and inorganic fibers, and a mixture of an inorganic binder, inorganic particles, inorganic fibers and the like.

The adhesive paste may contain an organic binder. Non-exclusive examples of an organic binder may include polyvinyl alcohol, methylcellulose, ethylcellulose, carboxymethylcellulose and the like. These may be used alone or in combination of two or more.

The adhesive paste may further contain a pore-forming agent. Non-exclusive examples of a pore-forming agent may include balloons, which are hollow microspheres of oxide ceramic, spherical acrylic particles, graphite and the like. These may be used alone or in combination of two or more. Examples of balloons may include alumina balloons, glass micro-balloons, shirasu balloons, fly ash balloons (FA balloons), mullite balloons and the like.

In an embodiment of the present invention, the Young's modulus of the adhesive layers 13 may be adjusted using the organic binder and the pore-forming agent.

Then a peripheral coating paste is applied onto the peripheral face of the cylindrical assembly of the honeycomb units 11, and is then dried and solidified. The peripheral coating paste may or may not contain the same material as the material of the adhesive paste. The peripheral coating paste may have the same composition as the composition of the adhesive paste.

The assembly of the honeycomb units 11 with the peripheral coating paste applied thereon is dried and solidified to obtain a honeycomb structure 10. In the case where the adhesive paste and/or the peripheral coating paste contains an organic binder, degreasing is preferably performed. Although degreasing conditions may be suitably selected according to the kind and amount of organic substances, degreasing is preferably performed at about 700° C. for about 2 hours.

Then, if necessary, a SOx absorbent and/or a noble metal catalyst are supported on the partition walls of the honeycomb structure 10. A dipping method (impregnating method) may be used for applying a SOx absorbent and/or a noble metal catalyst, although other methods may be used.

The honeycomb structure 10 of an embodiment of the present invention may or may not have the peripheral coating layer 14.

EXAMPLES

Example 1

First, 440 g of magnesium oxide as a SOx absorbent, 1810 g of γ alumina of 2 μm average particle diameter as inorganic particles, 680 g of alumina fibers of 6 μm average diameter and 50 μm average length, 2,600 g of alumina sol of 20 wt % solid concentration as a component containing an inorganic binder, and 320 g of methylcellulose as an organic binder were mixed to obtain a raw material paste. Then, the raw material paste was molded by extrusion molding using an extruder to obtain a raw molded body. The raw molded body was dried using a microwave dryer and a hot air dryer, and was then degreased at 400° C. for 2 hours. Then, the resulting product was fired at 700° C. for 2 hours to obtain a honeycomb unit having a square-pillar shape of 35 mm in length, 35 mm in width, 68 mm in height, 93 through holes per 1 $cm^2$ cross-sectional area perpendicular to the longitudinal direction, and 0.2 mm partition wall thickness.

Next, 19.4 parts by weight of γ alumina of 2 μm average particle diameter, 22.2 parts by weight of aluminum borate fibers of 1 μm average diameter and 15 μm average length, 23.5 parts by weight of alumina sol of 20 wt % solid concentration as a component containing an inorganic binder, 0.1 part by weight of carboxymethylcellulose as an organic binder, 15.0 parts by weight of carbon fibers of 18 μm average diameter and 150 μm average length as a pore forming agent, 2.8 parts by weight of polyvinyl alcohol, and 17.0 parts by weight of water were mixed to obtain a heat-resistant adhesive paste.

The adhesive paste was applied to form adhesive layers of 1 mm thickness. Plural of the honeycomb units were bonded to each other by interposing the adhesive layers and were then dried and solidified at 120° C. to form an assembly of the honeycomb units. Then, the assembly of the honeycomb units was cut into a cylindrical shape by using a diamond cutter so as to be substantially point symmetric in the cross section perpendicular to the longitudinal direction. Then, the adhesive paste was applied onto the peripheral face of the assembly of the honeycomb units to form a peripheral coating layer of 0.5 mm thickness. After that, the assembly of the honeycomb units was dried and solidified at 120° C. by using a microwave dryer and a hot air dryer, and was then degreased at 400° C. for 2 hours. Thus, a honeycomb structure having a cylindrical shape of 138 mm diameter and 68 mm height (2 L in volume) was obtained.

The obtained honeycomb structure was dipped into a platinum nitrate solution and then was maintained at 600° C. for 1 hour, so that platinum of 3 g/L was supported as a noble metal catalyst. The honeycomb structure supporting platinum contains 1.0 mol/L magnesium oxide.

Example 2

A honeycomb structure supporting platinum was obtained in the same manner as Example 1 except that 20.2 parts by weight of γ alumina of 2 μm average particle diameter, 23.2 parts by weight of aluminum borate fibers of 1 μm average diameter and 15 μm average length, 24.5 parts by weight of alumina sol of 20 wt % solid concentration, 0.1 part by weight of carboxymethylcellulose, 13.0 parts by weight of carbon fibers of 18 μm average diameter and 150 μm average length, 2.7 parts by weight of polyvinyl alcohol, and 16.3 parts by weight of water were mixed to obtain a heat-resistant adhesive paste. The honeycomb structure supporting platinum contains 1.0 mol/L magnesium oxide.

Example 3

A honeycomb structure supporting platinum was obtained in the same manner as Example 1 except that 21.2 parts by weight of γ alumina of 2 μm average particle diameter, 24.1 parts by weight of aluminum borate fibers of 1 μm average diameter and 15 μm average length, 25.6 parts by weight of alumina sol of 20 wt % solid concentration, 0.1 part by weight of carboxymethylcellulose, 10.7 parts by weight of carbon fibers of 18 μm average diameter and 150 μm average length, 2.6 parts by weight of polyvinyl alcohol, and 15.7 parts by weight of water were mixed to obtain a heat-resistant adhesive paste. The honeycomb structure supporting platinum contains 1.0 mol/L magnesium oxide.

Example 4

A honeycomb structure supporting platinum was obtained in the same manner as Example 1 except that magnesium oxide and γ alumina used for preparing a raw material paste were 600 g and 1,600 g, respectively; the average particle diameter of γ alumina was 4 μm; and the average length of alumina fibers was 80 μm. The honeycomb structure supporting platinum contains 1.5 mol/L magnesium oxide.

Example 5

A honeycomb structure supporting platinum was obtained in the same manner as Example 2 except that magnesium oxide and γ alumina used for preparing a raw material paste were 600 g and 1,600 g, respectively; the average particle diameter of γ alumina was 4 μm; and the average length of alumina fibers was 80 μm. The honeycomb structure supporting platinum contains 1.5 mol/L magnesium oxide.

Example 6

A honeycomb structure supporting platinum was obtained in the same manner as Example 1 except that magnesium oxide and γ alumina used for preparing a raw material paste were 1,070 g and 1,180 g, respectively; the average particle diameter of γ alumina was 6 μm; and the average length of alumina fibers was 110 μm. The honeycomb structure supporting platinum contains 2.5 mol/L magnesium oxide.

Comparative Example 1

A honeycomb structure supporting platinum was obtained in the same manner as Example 1 except that 22.1 parts by weight of γ alumina of 2 μm average particle diameter, 25.2 parts by weight of aluminum borate fibers of 1 μm average diameter and 15 μm average length, 26.7 parts by weight of alumina sol of 20 wt % solid concentration, 0.1 part by weight of carboxymethylcellulose, 8.3 parts by weight of carbon fibers of 18 μm average diameter and 150 μm average length, 2.5 parts by weight of polyvinyl alcohol, and 15.1 parts by weight of water were mixed to obtain a heat-resistant adhesive paste. The honeycomb structure supporting platinum contains 1.0 mol/L magnesium oxide.

Comparative Example 2

A honeycomb structure supporting platinum was obtained in the same manner as Example 4 except that 19.5 parts by weight of γ alumina of 2 μm average particle diameter, 22.3 parts by weight of aluminum borate fibers of 1 μm average diameter and 15 μm average length, 23.5 parts by weight of alumina sol of 20 wt % solid concentration, 0.1 part by weight of carboxymethylcellulose, 15.0 parts by weight of carbon fibers of 18 μm average diameter and 150 μm average length, 2.8 parts by weight of polyvinyl alcohol, and 16.8 parts by weight of water were mixed to obtain a heat-resistant adhesive paste. The honeycomb structure supporting platinum contains 1.5 mol/L magnesium oxide.

Comparative Example 3

A honeycomb structure supporting platinum was obtained in the same manner as Example 6 except that 20.6 parts by weight of γ alumina of 2 μm average particle diameter, 23.6 parts by weight of aluminum borate fibers of 1 μm average diameter and 15 μm average length, 25.1 parts by weight of alumina sol of 20 wt % solid concentration, 0.1 part by weight of carboxymethylcellulose, 12.0 parts by weight of carbon fibers of 18 μm average diameter and 150 μm average length, 2.6 parts by weight polyvinyl alcohol, and 16.0 parts by weight of water were mixed to obtain a heat-resistant adhesive paste. The honeycomb structure supporting platinum contains 2.5 mol/L magnesium oxide.

(Measurement of Young's Modulus)

According to the JIS R 1602 standard, a sample of 10 mm×10 mm×30 mm size was formed and a Young's modulus A of a honeycomb unit and a Young's modulus B of an adhesive layer were measured at room temperatures. The measurement results are shown in Table 1.

The contents of JIS R 1602 standard are incorporated by reference in their entirety.

TABLE 1

| | HONEYCOMB UNIT YOUNG'S MODULUS A [GPa] | ADHESIVE LAYER YOUNG'S MODULUS B [GPa] | B/A | STRENGTH |
|---|---|---|---|---|
| EXAMPLE 1 | 6.3 | 2.5 | 0.40 | ○ |
| EXAMPLE 2 | 6.3 | 5.0 | 0.79 | ○ |
| EXAMPLE 3 | 6.3 | 7.5 | 1.19 | ○ |
| EXAMPLE 4 | 4.8 | 2.5 | 0.52 | ○ |
| EXAMPLE 5 | 4.8 | 5.0 | 1.04 | ○ |
| EXAMPLE 6 | 3.6 | 2.5 | 0.69 | ○ |
| COMPARATIVE EXAMPLE 1 | 6.3 | 10.0 | 1.59 | X |
| COMPARATIVE EXAMPLE 2 | 4.8 | 6.0 | 1.25 | X |
| COMPARATIVE EXAMPLE 3 | 3.6 | 3.0 | 0.83 | X |

(Absorption of SOx)

While flowing a simulant gas of 400° C. into a honeycomb structure at a gas space velocity of 50,000/hr, the SOx concentration in the gas flowing out of the honeycomb structure was measured using a MEXA-7100D and a MEXA-1170SX (HORIBA Ltd.) (detection limit: 0.1 ppm). The stimulant gas was flowed into the honeycomb structure until the SOx concentration in the gas flowing out of the honeycomb structure reached 12.5 ppm. The constituents of the stimulant gas were nitrogen (balance), carbon dioxide (10 volume %), oxygen (10 volume %), nitric oxide (200 ppm), carbon monoxide (0 volume %), hydrocarbons (200 ppm), and sulfur dioxide (125 ppm).

(Evaluation of Strength)

The strength of the honeycomb structures after absorption of SOx was visually evaluated. The measurement results are shown in the above Table 1.

In Table 1, "○" indicates that no damage or no cracks were caused, while "x" indicates that damage or a crack was caused.

Figure 2:
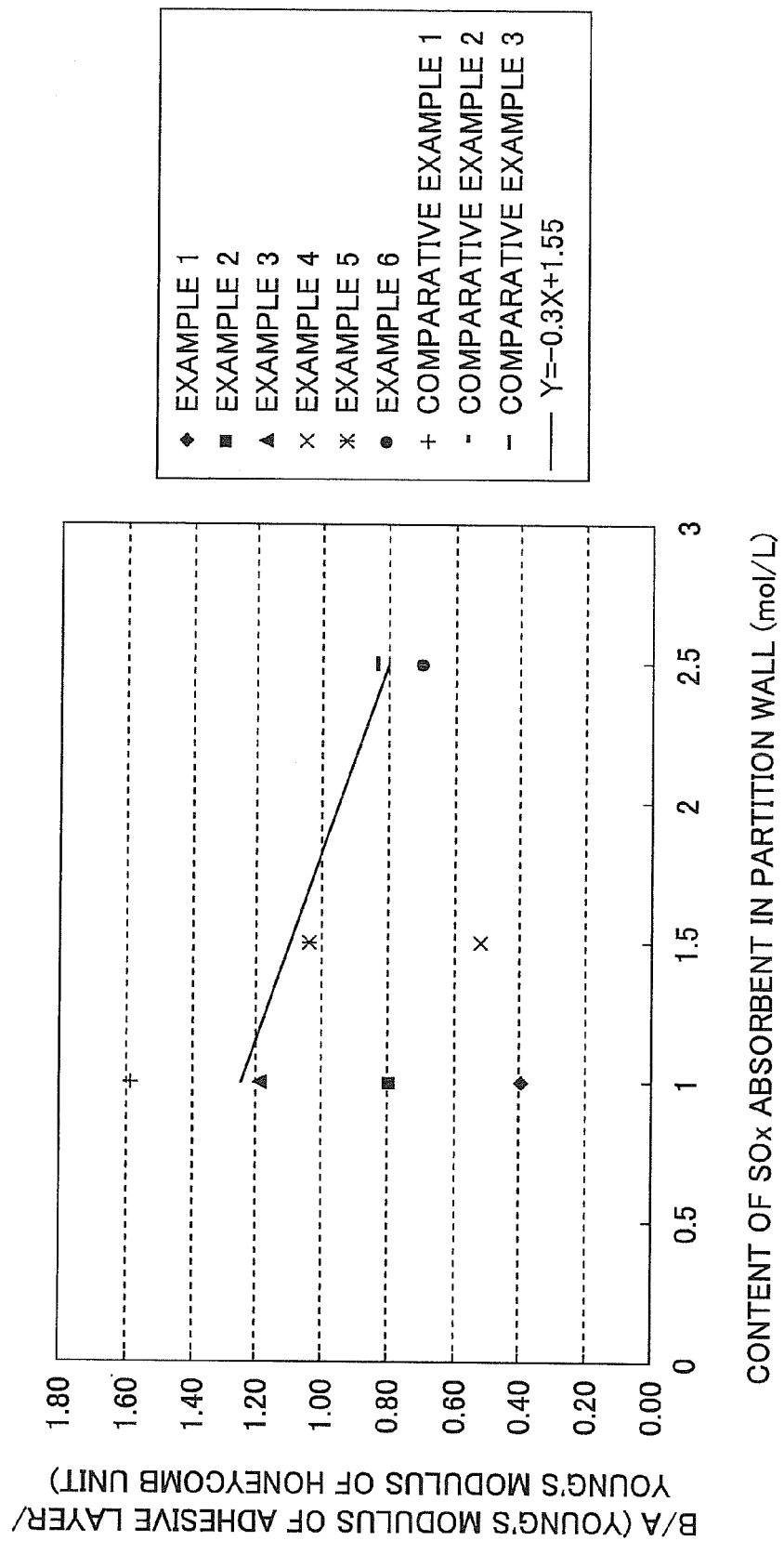
FIG. 2 is a graph showing the relationship of the ratio of the Young's modulus B of adhesive layers to a Young's modulus A of honeycomb units, i.e., the ratio B/A, with respect to the content of SOx absorbent in partition walls.

The relationship of the ratio of the Young's modulus B of the adhesive layers to the Young's modulus A of the honeycomb units, i.e., the ratio B/A (Y), with respect to the content (X) of a SOx absorbent in partition walls is shown in the graph of FIG. 2.

The results show that the honeycomb units of Examples 1 to 6 that satisfy the expression $Y \leq -0.3X+1.55$ (about $1.0 \leq X \leq$ about 2.5) are not easily damaged even if the honeycomb structures have absorbed a large amount of SOx.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A honeycomb structure comprising:
   adhesive layers;
   plural honeycomb units bonded to each other by interposing the adhesive layers between the plural honeycomb units, each of the honeycomb units having partition walls extending along a longitudinal direction of the honeycomb units to define plural through holes, the plural honeycomb units comprising:
   a SOx absorbent;
   inorganic particles;
   an inorganic binder; and
   an expression $Y \leq 0.3X+1.55$ (about $1.0 \leq X \leq$ about 2.5) being satisfied, in which X represents a content (mol/L) of the SOx absorbent in the partition walls and Y represents a ratio B/A in which A represents a Young's modulus of the honeycomb units and B represents a Young's modulus of the adhesive layers.

2. The honeycomb structure as claimed in claim 1, wherein at least a part of the SOx absorbent is supported on the partition walls.

3. The honeycomb structure as claimed in claim 1, wherein the SOx absorbent includes at least one of alkali metal and alkali earth metal.

4. The honeycomb structure as claimed in claim 3, wherein the SOx absorbent includes at least one of sodium, potassium, magnesium, calcium and barium.

5. The honeycomb structure as claimed in claim 1, wherein the inorganic particles comprise at least one of alumina, titania, silica, zirconia, ceria, mullite, and zeolite.

6. The honeycomb structure as claimed in claim 1, wherein an average particle diameter of the inorganic particles is at least about 0.1 μm and at most about 10 μm.

7. The honeycomb structure as claimed in claim 1, wherein a content of the inorganic particles is at least about 30 wt % and at most about 90 wt %.

8. The honeycomb structure as claimed in claim 1, wherein the inorganic binder comprises solids content contained in at least one of alumina sol, silica sol, titanium sol, liquid glass, sepiolite, and attapulgite.

9. The honeycomb structure as claimed in claim 1, wherein a content of the inorganic binder is at least about 5 wt % and at most about 50 wt %.

10. The honeycomb structure as claimed in claim 1, wherein the honeycomb unit further includes inorganic fibers.

11. The honeycomb structure as claimed in claim 10, wherein the inorganic fibers comprise at least one of alumina, silica, silicon carbide, silica alumina, glass, potassium titanate, and aluminum borate.

12. The honeycomb structure as claimed in claim 10, wherein an aspect ratio of the inorganic fibers is at least about 2 and at most about 1,000.

13. The honeycomb structure as claimed in claim 10, wherein a content of the inorganic fibers is at least about 3 wt % and at most about 50 wt %.

14. The honeycomb structure as claimed in claim 1, wherein an area of a cross section of each of the honeycomb units perpendicular to the longitudinal direction is at least about 5 cm$^2$ and at most about 50 cm$^2$.

15. The honeycomb structure as claimed in claim 1, wherein a thickness of the partition walls is at least about 0.05 mm and at most about 0.35 mm.

16. The honeycomb structure as claimed in claim 1, wherein a number of through holes per 1 cm$^2$ cross-sectional area of the honeycomb unit perpendicular to the longitudinal direction is at least about 15.5 holes and at most about 186 holes.

17. The honeycomb structure as claimed in claim 1, wherein a peripheral face of the honeycomb structure is coated with a peripheral coating layer.

18. The honeycomb structure as claimed in claim 1, wherein a noble metal catalyst is supported on the partition walls.

19. The honeycomb structure as claimed in claim 18, wherein the noble metal catalyst includes at least one of platinum, palladium, and rhodium.

* * * * *